US010069732B2

(12) United States Patent
Narayanan et al.

(10) Patent No.: US 10,069,732 B2
(45) Date of Patent: Sep. 4, 2018

(54) TECHNIQUES FOR ARCHITECTURE-INDEPENDENT DYNAMIC FLOW LEARNING IN A PACKET FORWARDER

(71) Applicant: Telefonaktiebolaget LM Ericsson (publ), Stockholm (SE)

(72) Inventors: Srikanth Narayanan, San Jose, CA (US); Matias Cavuoti, San Jose, CA (US); Arunkumar M. Desigan, San Jose, CA (US); Vikram Guleria, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 118 days.

(21) Appl. No.: 15/291,671

(22) Filed: Oct. 12, 2016

(65) Prior Publication Data
US 2018/0069793 A1  Mar. 8, 2018

Related U.S. Application Data

(60) Provisional application No. 62/383,380, filed on Sep. 2, 2016.

(51) Int. Cl.
*H04L 12/26* (2006.01)
*H04L 12/801* (2013.01)
*H04L 12/721* (2013.01)
*H04L 12/819* (2013.01)

(52) U.S. Cl.
CPC .............. *H04L 47/10* (2013.01); *H04L 45/72* (2013.01); *H04L 47/215* (2013.01)

(58) Field of Classification Search
None
See application file for complete search history.

(56) References Cited

U.S. PATENT DOCUMENTS

| 2012/0246450 | A1* | 9/2012 | Abdallah | G06F 9/5077 712/216 |
| 2013/0188494 | A1 | 7/2013 | Mekkattuparamban et al. | |
| 2015/0124815 | A1* | 5/2015 | Beliveau | H04L 45/38 370/392 |

(Continued)

*Primary Examiner* — Otis L Thompson, Jr.
(74) *Attorney, Agent, or Firm* — Nicholson De Vos Webster & Elliott, LLP

(57) ABSTRACT

Exemplary techniques for architecture-independent dynamic flow learning in a packet forwarder are described. A packet forwarder includes a plurality of forwarding threads and a plurality of provisioning threads, and can implement three functional blocks to learn new flows—an admission control block, a forwarding database building block, and a notification path block. An admission control module can control the ability for forwarding threads to place flow operation requests in operation queues. Provisioning threads independently manage particular operation queues, and can update corresponding portions of a control database and a forwarding database. Flow operation notifications can be managed through notification queues, which can be drained back into the operation queues for the provisioning threads to later process. The packet forwarder thus can benefit from a highly-parallel, highly-efficient software-based approach to flow learning operations that does not require specialized hardware support.

20 Claims, 9 Drawing Sheets

(56) References Cited

U.S. PATENT DOCUMENTS

| | | | |
|---|---|---|---|
| 2016/0182380 A1* | 6/2016 | Mehra | H04L 47/125 |
| | | | 709/226 |
| 2016/0285753 A1* | 9/2016 | Guleria | H04L 45/38 |
| 2016/0352613 A1* | 12/2016 | Narayanan | H04L 45/021 |
| 2017/0063695 A1* | 3/2017 | Ferrell | H04L 47/21 |
| 2017/0346732 A1* | 11/2017 | Zhang | H04L 45/745 |
| 2018/0083866 A1* | 3/2018 | Gobriel | H04L 45/38 |
| 2018/0091415 A1* | 3/2018 | Chanda | H04L 45/02 |

* cited by examiner

TECHNIQUES FOR ARCHITECTURE-INDEPENDENT DYNAMIC FLOW LEARNING IN A PACKET FORWARDER

CROSS-REFERENCE TO RELATED APPLICATIONS

This application claims the benefit of U.S. Provisional Application No. 62/383,380, filed Sep. 2, 2016, which is hereby incorporated by reference.

TECHNICAL FIELD

Embodiments relate to the field of computer networking; and more specifically, to techniques for architecture-independent dynamic flow learning in a packet forwarder.

BACKGROUND

Most modern computing applications and systems, despite their continually changing architectures, fundamentally rely upon the ability to communicate with other applications and systems. This reliance has only become stronger with the widespread adoption of mobile computing devices, which provide a variety of services that involve sending and/or retrieving data to/from remote systems despite the often-changing locations of these mobile devices.

Many computer networks utilize packets for such communications, and thus may be referred to as packet-switched networks or packet-oriented networks. Such packet networks typically operate utilizing packet forwarders (e.g., switches) that receive packets and "forward" these packets on to other nodes. Accordingly, transmitted packets may be forwarded from a source potentially many times across many "hops" in one or more networks to a destination. Packets, from the standpoint of network elements, may be viewed as belonging to network "flows", where each flow may represent a number of packets having common characteristics, such as a common source and/or destination address, etc.

Many packet forwarders utilize dedicated, special-purpose hardware elements to perform particular forwarding-related operations such as packet classification, flow learning, etc. Such dedicated hardware can provide very fast processing for these operations, reducing the amount of time for packets to be forwarded by the packet forwarder which thus, especially when utilized with other special-purpose packet forwarders, can reduce the amount of time required for a packet to move from its source to its destination. Such time efficiency is very important for many modern applications, such as audio/visual communications, real-time (or near real-time) monitoring, etc.

However, a relatively recent but widespread computing trend related to virtualization involves implementing software solutions to perform tasks that previously had been performed by hardware, resulting in ease of management, physical space saving, power saving, lower cost of ownership, flexibility, and other benefits. Accordingly, many network functions (e.g., routers, switches, firewalls, etc.) that previously involved the deployment of special-purpose hardware units have begun to be implemented using software-centric approaches. However, such software solutions tend to be inherently less efficient (in terms of time utilization, resource utilization, etc.) than the corresponding hardware solutions, as the processing units (e.g., general purpose computer processor(s), network processor(s), etc.) may have limited or non-existent hardware support for certain required operations (such as performing lookups/searches, encryption, encoding/decoding, etc.).

Accordingly, there exists a significant need for improved software-based solutions to efficiently implement many network functions, including packet forwarding operations.

SUMMARY

Systems, methods, apparatuses, computer program products, and machine-readable media are provided for architecture-independent dynamic flow learning in a packet forwarder.

According to some embodiments, a method in a packet forwarder implemented by a device is for architecture-independent dynamic flow learning. The packet forwarder includes a plurality of forwarding threads and a plurality of provisioning threads executed by the device. The method includes receiving a packet to be forwarded by a forwarding thread of the plurality of forwarding threads. The packet is of a new flow of traffic from the perspective of a forwarding data structure utilized by the plurality of forwarding threads to forward packets. The method also includes responsive to determining, by the forwarding thread according to an admission mechanism, that the forwarding thread is allowed to submit a request for the new flow to be learned by the packet forwarder, inserting data corresponding to the packet into an entry of an operation queue of a plurality of operation queues. Each of the plurality of operation queues is exclusively operated on by a corresponding provisioning thread of the plurality of provisioning threads. The method also includes obtaining, by the provisioning thread corresponding to the operation queue, the inserted data from the entry of the operation queue. The method also includes updating, by the provisioning thread, a bucket from a plurality of buckets of a control data structure to include flow data for the new flow. Each of the plurality of buckets is exclusively operated on by a corresponding provisioning thread of the plurality of provisioning threads and thus is mapped to a corresponding operation queue of the plurality of operation queues. The method also includes updating, by the provisioning thread, a forwarding bucket of a plurality of forwarding buckets of the forwarding data structure based upon the updated bucket of the control data structure. The method also includes forwarding, by a second forwarding thread, an additional one or more packets of the new flow based upon the updated forwarding bucket of the forwarding data structure.

In some embodiments, the method further includes inserting, by the provisioning thread, an entry into a notification queue that corresponds to the operation queue. In some embodiments, the method further includes inserting, after a threshold amount of time by the provisioning thread, a second entry into the operation queue that corresponds to the notification queue based upon the entry of the notification queue; obtaining, by the provisioning thread after the inserting of the second entry, the second entry from the operation queue; and sending, by the provisioning thread, a notification indicating that the new flow has been learned by the packet forwarder. In some embodiments, the second entry is inserted into the operation queue that corresponds to the notification queue along with one or more other entries as part of a batch operation. The one or more other entries are based upon one or more other entries of the notification queue.

In some embodiments, the determining according to the admission mechanism that the forwarding thread is allowed to submit a request for the new flow to be learned by the packet forwarder includes determining, by the forwarding thread, that there is a flow slot within an admission bucket that is free, and reserving, by the forwarding thread, the flow slot utilizing a compare and swap operation. In some embodiments, determining that there is the free flow slot within the admission bucket comprises utilizing, by the forwarding thread, a first set of one or more bits of a hash value to identify the admission bucket from a plurality of admission buckets, wherein the hash value that was generated based upon a hashing algorithm and values from the packet; comparing, by the forwarding thread, a second set of one or more bits of the hash value with corresponding bits stored in each flow slot of a plurality of flow slots of the admission bucket to determine that the admission bucket does not include a duplicate flow; and determining that the flow slot is free based upon one or more bit values of the flow slot.

In some embodiments, the method further includes receiving another packet to be forwarded by a second forwarding thread of the plurality of forwarding threads, and responsive to determining, by the second forwarding thread according to the admission mechanism, that the second forwarding thread is allowed to submit another request for the second new flow to be learned by the packet forwarder, inserting data corresponding to the another packet into a second entry of a second operation queue of the plurality of operation queues. The another packet is of another new flow of traffic from the perspective of the forwarding data structure. The determining that the second forwarding thread is allowed to submit another request for the second new flow to be learned by the packet forwarder comprises determining that there is not any free entry in the admission bucket, and bypassing the admission bucket responsive to a strict admittance condition being true.

According to some embodiments, a non-transitory machine readable medium provides instructions which, when executed by a processor of a device, will cause said device to implement a packet forwarder to perform operations for architecture-independent dynamic flow learning. The packet forwarder comprises a plurality of forwarding threads and a plurality of provisioning threads executed by the device. The operations include receiving a packet to be forwarded by a forwarding thread of the plurality of forwarding threads. The packet is of a new flow of traffic from the perspective of a forwarding data structure utilized by the plurality of forwarding threads to forward packets. The operations also include responsive to determining, by the forwarding thread according to an admission mechanism, that the forwarding thread is allowed to submit a request for the new flow to be learned by the packet forwarder, inserting data corresponding to the packet into an entry of an operation queue of a plurality of operation queues. Each of the plurality of operation queues is exclusively operated on by a corresponding provisioning thread of the plurality of provisioning threads. The operations also include obtaining, by the provisioning thread corresponding to the operation queue, the inserted data from the entry of the operation queue. The operations also include updating, by the provisioning thread, a bucket from a plurality of buckets of a control data structure to include flow data for the new flow. Each of the plurality of buckets is exclusively operated on by a corresponding provisioning thread of the plurality of provisioning threads and thus is mapped to a corresponding operation queue of the plurality of operation queues. The operations also include updating, by the provisioning thread, a forwarding bucket of a plurality of forwarding buckets of the forwarding data structure based upon the updated bucket of the control data structure. The operations also include forwarding, by a second forwarding thread, an additional one or more packets of the new flow based upon the updated forwarding bucket of the forwarding data structure.

According to some embodiments, a device includes one or more processors and a non-transitory machine-readable storage medium. The non-transitory machine readable medium provides instructions which, when executed by the one or more processors, will cause the device to implement the packet forwarder to perform operations for architecture-independent dynamic flow learning. The packet forwarder comprises a plurality of forwarding threads and a plurality of provisioning threads executed by the device. The operations include receiving a packet to be forwarded by a forwarding thread of the plurality of forwarding threads. The packet is of a new flow of traffic from the perspective of a forwarding data structure utilized by the plurality of forwarding threads to forward packets. The operations also include responsive to determining, by the forwarding thread according to an admission mechanism, that the forwarding thread is allowed to submit a request for the new flow to be learned by the packet forwarder, inserting data corresponding to the packet into an entry of an operation queue of a plurality of operation queues. Each of the plurality of operation queues is exclusively operated on by a corresponding provisioning thread of the plurality of provisioning threads. The operations also include obtaining, by the provisioning thread corresponding to the operation queue, the inserted data from the entry of the operation queue. The operations also include updating, by the provisioning thread, a bucket from a plurality of buckets of a control data structure to include flow data for the new flow. Each of the plurality of buckets is exclusively operated on by a corresponding provisioning thread of the plurality of provisioning threads and thus is mapped to a corresponding operation queue of the plurality of operation queues. The operations also include updating, by the provisioning thread, a forwarding bucket of a plurality of forwarding buckets of the forwarding data structure based upon the updated bucket of the control data structure. The operations also include forwarding, by a second forwarding thread, an additional one or more packets of the new flow based upon the updated forwarding bucket of the forwarding data structure.

Accordingly, some embodiments can provide a highly parallel, highly performant, flexibly-implemented packet forwarding architecture (based on network or general purpose processor) that can perform efficient flow learning in the forwarding plane, even when lacking dedicated hardware components to do so. Accordingly, some embodiments can be relatively simple to implement and can be ported across various architectures without requiring any specialized hardware.

BRIEF DESCRIPTION OF THE DRAWINGS

The invention may best be understood by referring to the following description and accompanying drawings that are used to illustrate embodiments. In the drawings.

DETAILED DESCRIPTION

Figure 1:
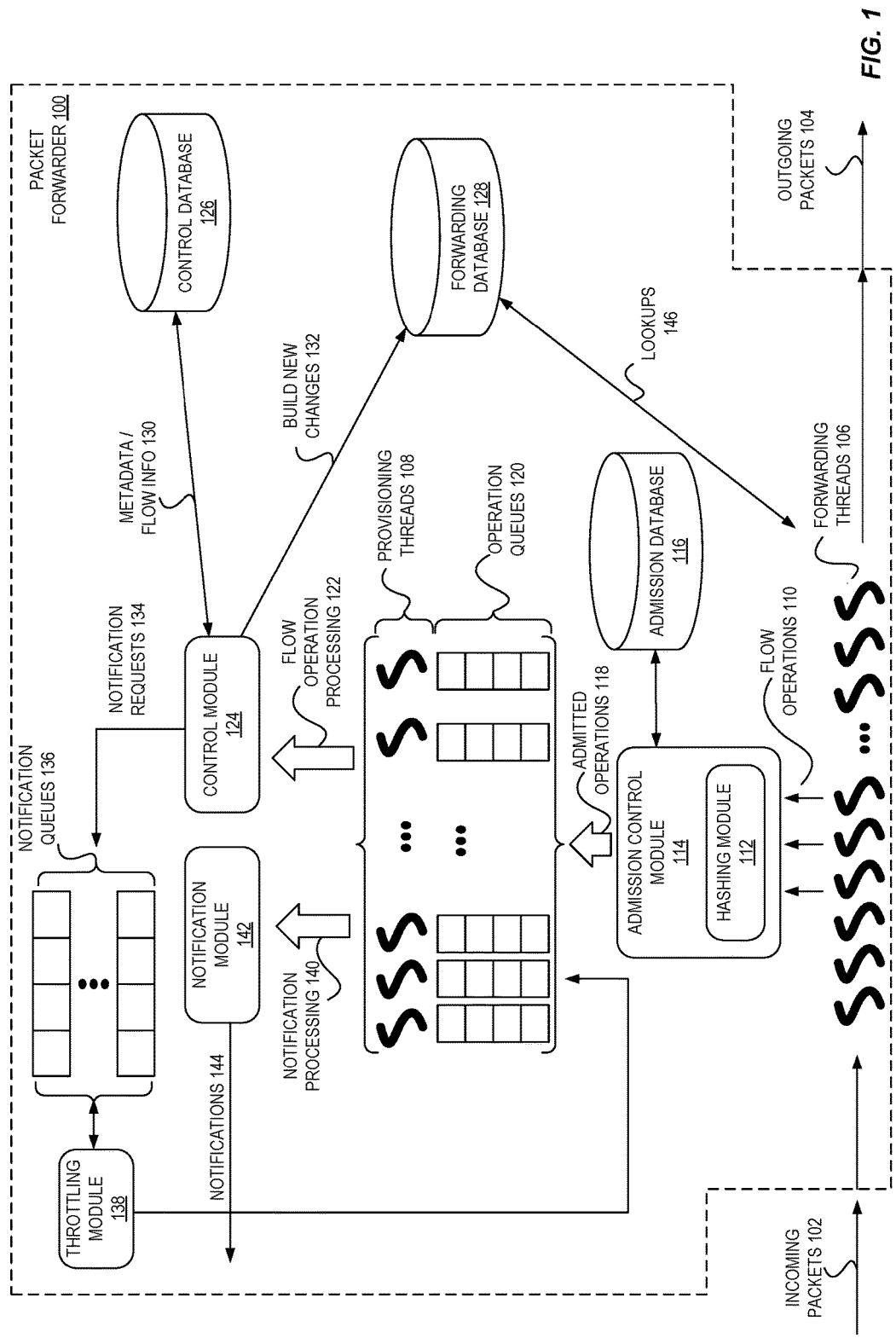
FIG. 1 is a block diagram illustrating a packet forwarder utilizing architecture-independent dynamic flow learning according to some embodiments.

The following description describes techniques for architecture-independent dynamic flow learning in a packet forwarder. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In many network architectures, packet forwarders perform flow learning to identify information associated with flows of packets and configure themselves accordingly to thereafter enable proper forwarding operations.

For example, a packet forwarder may operate as a network bridge (or "layer 2 switch") to, e.g., create a connection between two separate computer networks, divide one network into two logical networks, etc., by forwarding data based upon Media Access Control (MAC) addresses (also referred to as "physical addresses" or "hardware addresses") of communicating devices. Thus, the packet forwarder may perform flow learning to identify the MAC addresses involved in such communications and how to properly forward the traffic associated therewith.

As indicated above, a network bridge can be implemented using special-purpose hardware that can provide such MAC address learning capabilities. However, it has become beneficial in many environments to implement network bridges without such dedicated purpose hardware, such as in a network device with a network processor that does not have that special-particular hardware capability (e.g., to save physical space and/or cost), or in a device with a more general-purpose processor (e.g., as a virtualized or "software" network bridge) that similarly does not have special-purpose flow learning hardware.

To this end, embodiments disclosed herein can provide a scalable, highly-parallel, highly-performant, "generic" packet forwarding architecture (based on a network processor or general purpose processor) that can perform efficient flow learning in the forwarding plane, even when lacking dedicated hardware components to do so. Moreover, some embodiments can be relatively simple to implement and can be ported across various architectures without requiring any specialized hardware.

All packet forwarding architecture consists of two kinds of processing constructs. The provisioning construct and the forwarding construct. Embodiments take the "flow learning" load off of the forwarding construct, and can efficiently send it to the provisioning (or background) construct. Accordingly, by utilizing carefully laid out processing logic, in some embodiments flow learning can be implemented as a highly parallel, highly scalable, and lock-less solution.

FIG. 1 is a block diagram illustrating a packet forwarder 100 utilizing architecture-independent dynamic flow learning according to some embodiments. Embodiments provide a basic infrastructure to efficiently build and maintain a flow information database (also referred to as a forwarding database 128 or forwarding information base (FIB)) on the forwarding path within a highly parallel system. Embodiments use two main groups of threads: forwarding threads 106, which manage incoming packets 102 coming in on the line, and provisioning threads 108, which are in charge of maintaining the databases (e.g., forwarding database 128) the forwarding threads 106 use to make their forwarding decisions (e.g., via lookups 146).

From a high-level overview, in some embodiments "work" is generated by the forwarding threads 106 (as incoming new operations) and serviced by the provisioning threads 108. Embodiments utilize three main blocks—admission control, forwarding database building, and notification path.

In the admission control block, flow operations 110 can be admitted or rejected based on the capacity at the issuing time. The admission can be completely lockless and decentralized for efficiency in processing different parallel requests. Embodiments can also support other features like prioritization and strict admittance for requests that cannot be "lost." Embodiments also can accommodate different forwarding threads 106 issuing flow operations 110 for a same flow by, for example, only letting one such flow operation 110 be admitted (or "come through").

The forwarding database building block is tasked with updating the forwarding database 128 based on the type of each operation (e.g., update a flow, learn a new flow, etc.). This can also be performed in a lockless and parallel manner for maximum efficiency. In some embodiments, two constituents of the block are the control database 126 and the forwarding database 128. The control database 126 is the data structure from where the forwarding database 128 is built, where the forwarding database 128 is used by the forwarding path (i.e., forwarding threads 106) to perform lookups 146. Embodiments may tightly couple both data structures, trie trees, and hash tables to maximize the throughput by taking advantage of some of the intrinsic properties of each.

Additionally, the notification path block is where applications may be provided notifications (e.g., information indicating which flow was learned) based upon the operations of the forwarding database building block. Some embodiments can implement the notification path block in a completely lockless and parallel manner, while being detached from the forwarding database building block to prevent any impact on its performance. In some embodiments, notifications can be delivered via a timer-based model, in which the rate of the timer can be adjusted as needed.

Thus, embodiments implement a parallel system without hardware aid to perform an efficient flow database management that can be used by different features, such as bridging, Internet Protocol Flow Information Export (IPFIX), etc.

For further explanation, each block will now be described in additional detail.

The admission control block represents the entry point for flow operations requests 110 coming through the fastpath (i.e., from the forwarding threads 106). Each operation request 110 can be admitted or not based on the priority it is flagged with and/or the current system availability. The mechanism relies on an admission database 116, which holds a number of available slots for incoming requests to take. When all slots are taken, a request will not be accepted and an associated application may be notified of this refusal. This admission control scheme can provide benefits in that it can intelligently handle duplicate requests while keeping the system from overloading on the other.

Figure 3:
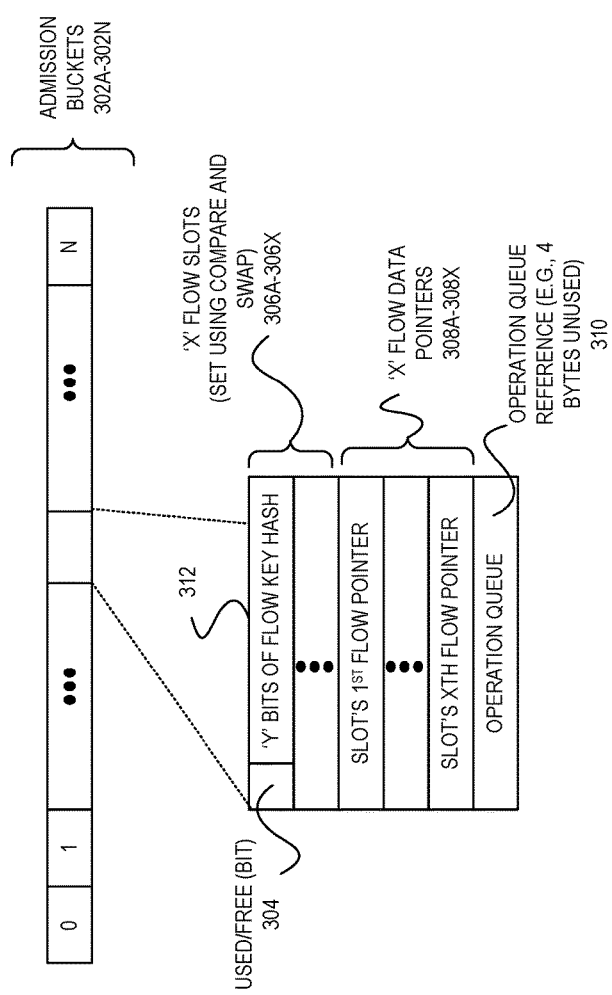
FIG. 3 is a block diagram illustrating an exemplary admission database utilized for architecture-independent dynamic flow learning according to some embodiments.

As an example, FIG. 3 is a block diagram illustrating an exemplary admission database 300 utilized for architecture-independent dynamic flow learning according to some embodiments. In some embodiments, the admission database includes several buckets 302A-302N, each containing 'X' flow slots 306A-306X. Each bucket 302 can be indexed via some configurable number of bits taken from a hash taken of a key associated with a packet. Thus, with reference to FIG. 1, for a flow operation 110, a hashing module 112 may compute a hash value using some hash algorithm (many of which are known to those of skill in the art) and a "key" of a packet, which can include one or more values of the packet. For example, a key could be the Transmission Control Protocol/Internet Protocol (TCP/IP) connection "5-tuple"—a source Internet Protocol (IP) address, a destination IP address, a source port, a destination port, and an IP protocol identifier. As another example, a key could be a 3-tuple of source IP address, destination IP address, and IP protocol identifier. Of course, other keys can be utilized based upon the preferences of the implementing entity and/or the particular characteristics of the operating environment, which can be identified and configured by one of ordinary skill in the art. As a result, the hashing module 112 can thus generate a "hash" value, which is provided to the admission control module 114.

The admission control module 114 can thereafter use one or more bits of the hash value to index the admission database and thus, identify one of the admission buckets 302A-302N.

As indicated above, each of the admission buckets 302A-302N may have "X" flow slots 306A-306X. Each slot may have a bit value 304 (or "used/free bit") to indicate whether that slot is taken or not (i.e., is "used" or is "free") and may have "Y" bits to store the first "Y" bits 312 of the key's hash.

As a consequence, it follows that during admission if two keys with a hash that share the first "Y" bits (e.g., offset by the bits used to select the bucket) then one of them will get rejected due to a collision. This property can be beneficial, as multiple threads attempting to perform an operation for a same flow (e.g., learn a new flow) at approximately the same time will have such a collision, and thus, only one of the threads will succeed. Additionally, although it is possible that non-similar flows (i.e., two different flows) may potentially have a same "Y" bits of their hashes, this possibility can be reduced by increasing the size of "Y." Moreover, even if a collision were to occur for operations pertaining to two different flows, the later-arriving flow operation can trivially be re-admitted very shortly thereafter once the first flow has been processed.

The admission mechanism can also be tied to the thread distribution (i.e., work load balancing). In some embodiments, each admission bucket is tied to an operation queue from which a particular provisioning thread gets its work from. In some such embodiments, the bucket may include an operation queue reference 310 indicating an address of the associated operation queue. In some embodiments, each slot in the bucket also comes with an associated flow data pointer 308A-308X, which can be a pre-allocated piece of memory where the flow data is stored (e.g., for the application and the infrastructure's internal usage).

Figure 4:
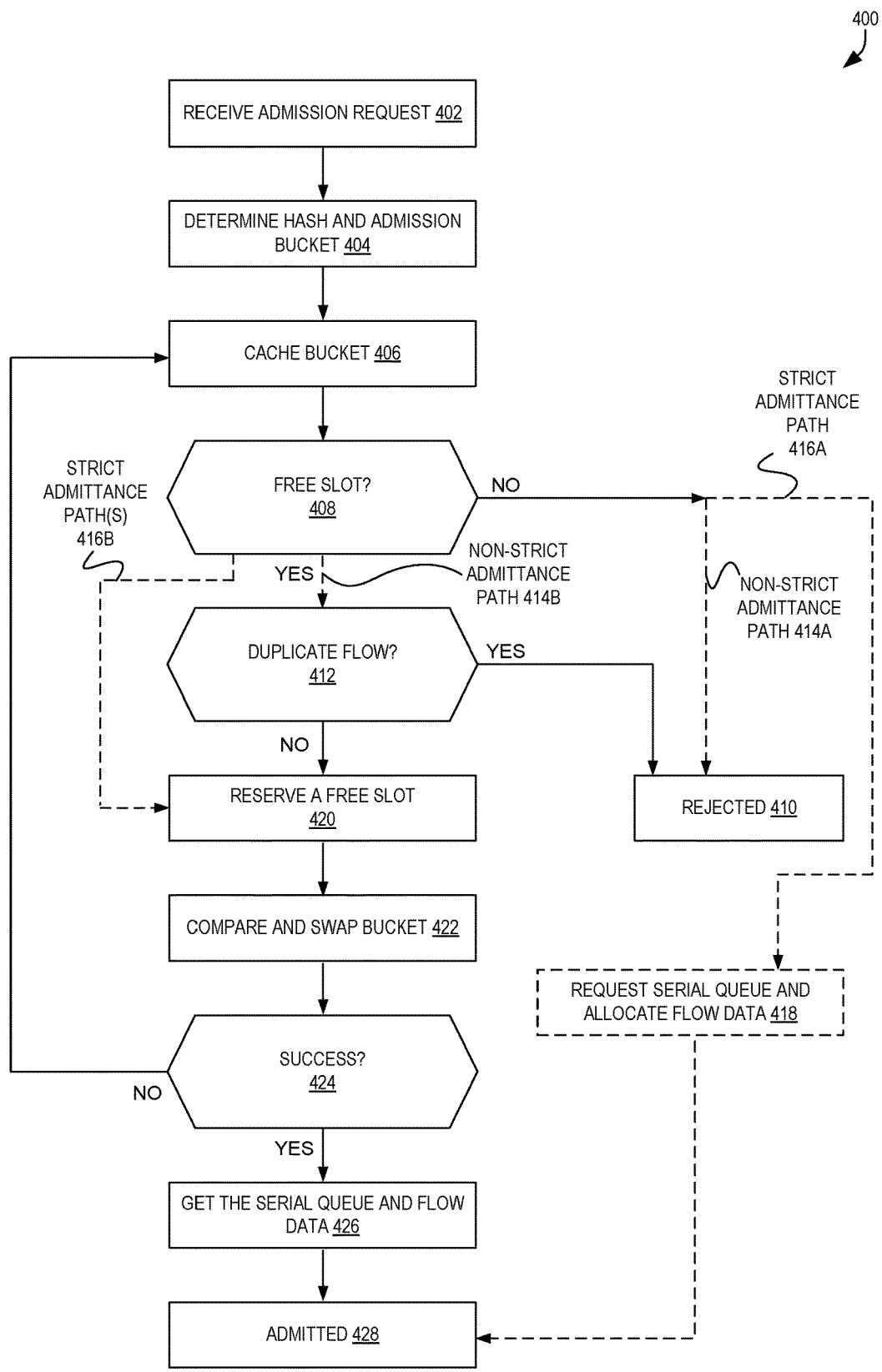
FIG. 4 is a flow diagram illustrating a flow for admission processing for architecture-independent dynamic flow learning according to some embodiments.

Accordingly, the admission database 116/300 can be utilized by the admission control module 114 to perform such admission control operations. Some example admission control operations are provided in FIG. 4, which is a flow diagram illustrating a flow 400 for admission processing for architecture-independent dynamic flow learning according to some embodiments. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams. Accordingly, the operations of flow 400 can be performed by the admission control module 114 of FIG. 1.

The flow 400 includes, at block 402, receiving an admission request (e.g., a flow operation 110 request) and, at block 404, determining a hash value (e.g., computing a key, generating a hash using a hash algorithm and the key) and determining the corresponding admission bucket (e.g., using one or more bits of the hash to identify one of the admission buckets) for the request.

At block 406, the admission bucket can be cached (or "retrieved"), and at 408, the flow 400 includes determining whether there are any "free" flow slots remaining in the admission bucket, which can include determining whether there are any used/free values 304 indicating that one of the flow slots is free (e.g., finding a used/free value that is "0").

If no free slots are determined at decision block 408, in some cases the flow 400 continues to block 410, where the admission request is rejected. This can be referred to as a "non-strict" admittance path 414A, which is in contrast to another "strict" admittance path 416A that can be enabled in some embodiments. This strict admittance path 416A can be used to, for example, allow an admission request to be serviced (e.g., admitted to an operation queue) despite not being able to place the request in an admission bucket's flow slot. This may be important in some settings where, for example, a new flow to be learned should not be missed (e.g., when a particular event may not happen again). In this case, the flow 400 can continue via the strict admittance path 416A to block 418, where a request can be placed in an operation queue and flow data is allocated.

If, at decision block 408, it is determined that there is a free slot in the admission bucket, the flow 400 may continue via a non-strict admittance path 414B to block 412, which includes determining whether the flow is a duplicate of another flow in the bucket. For example, in some embodiments block 412 includes determining whether the "Y" bits of the key are the same as any of the "Y" bits stored in the "X" flow slots 306 (of any "used" flow slot, that is, as indicated by the used/free value 304 of each flow slot). If there is no match, then the flow is not a duplicate and the flow 400 may continue to block 420; however, if there is a match, then the packet flow is a duplicate, and the flow 400 can continue to block 410 where the admission request is rejected (due to the packet flow being a duplicate—e.g., via an earlier request on the same flow, or due to data for another flow existing in the bucket having the same "Y" bits).

However, in some embodiments utilizing a strict admittance scheme, upon determining that there is a free slot at block 408, the flow may continue via strict admittance path 416B to block 420, thus actually bypassing (by not performing block 412) or effectively bypassing (by performing block 412, but ignoring the result thereof) the duplicate flow check of block 412.

At block 420, a free flow slot is reserved and then at block 422, the bucket can be atomically updated, e.g., via a compare-and-swap operation. If the update at block 422 was not a success (at decision block 424), the flow 400 can continue back to block 406, where a new copy of the bucket can be cached, etc. If the update at block 422 was a success (at decision block 424), the flow 400 can continue to block 426, where a request can be placed in the associated operation queue and flow data is allocated. Thus, the admission request at block 428 is deemed to be admitted.

Continuing back to FIG. 1, we can now consider the operations of the forwarding database building block. After the admission control block resulting with the admitted operations 118, the next phase is to start processing work out of the operation queues 120. Accordingly, in some embodiments, each provisioning thread 108 will pull out a work item from a corresponding operation queue 120 and, based on the operation, perform the necessary changes to the forwarding database 128 and all supporting data structures (e.g., control database 126, etc.). To better understand how this works in some embodiments using a multi-threaded and lockless scheme, we will first consider the control database 126.

Figure 5:
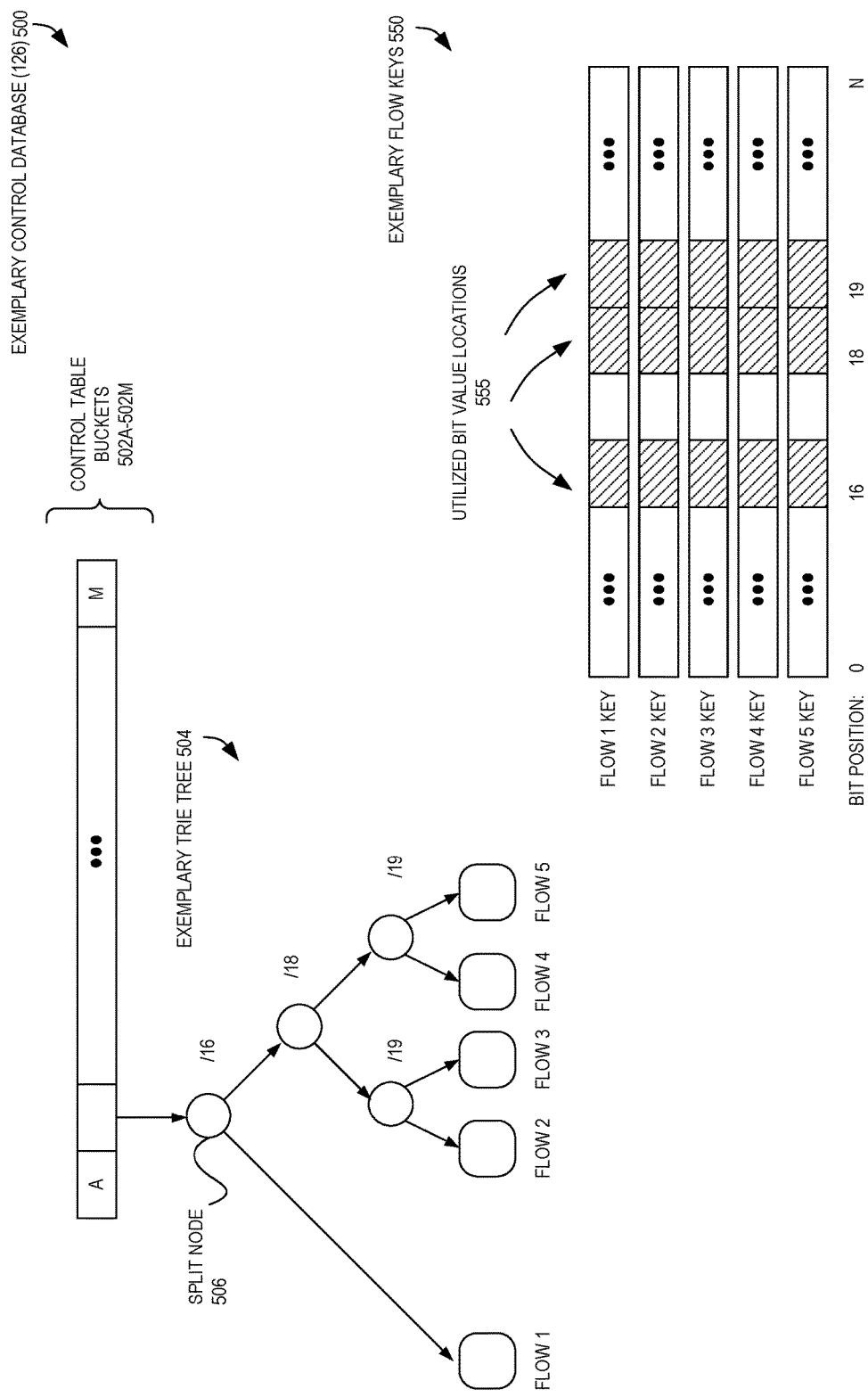
FIG. 5 is a block diagram illustrating an exemplary control database and exemplary flow keys utilized for architecture-independent dynamic flow learning according to some embodiments.

FIG. 5 is a block diagram illustrating an exemplary control database 500 and exemplary flow keys 550 utilized for architecture-independent dynamic flow learning according to some embodiments. In some embodiments, the control database 500 is simply a hash-based table where each bucket (of multiple buckets 502A-502M) is a trie tree 504 having flow data at its leaves. Each bucket 502 can be tied to a particular operation queue (and hence, a provisioning thread), which can be done by using a subset of the hash bits from the flow's key as a means to index the bucket. Notably, this subset can be bigger than the admission's control subset of bits, which can guarantee that any given bucket in the control database 126/500 is always mapped to a unique operation queue for any given operation, which guarantees that no two threads will work on the same given bucket, thus guaranteeing lockless thread safeness.

All the flows present in the control database 126/500 reside within one of the control table's buckets 502 and particularly within the trie tree 504. This trie tree 504 structure beneficially provides collision resolution (in case two or more flows collide in the same bucket), and further, the split nodes 506 generated within the trie tree 504, when inserting more than one item, will also point to the bit locations which if picked are enough to distinguish between all colliding items. Accordingly, the trie tree 504 illustrated can be traversed using certain bit value locations 555 shown in exemplary flow keys 550—here, the sixteenth ($16^{th}$) bit value, the eighteenth ($18^{th}$) bit value, and the nineteenth ($19^{th}$) bit value. Notably, these bit values map to particular values at split nodes 506 of the trie tree 504, and thus these values "index" the trie tree 504.

Since each control table bucket 502A-502M is processed always by the same provisioning thread, any processing needed to be performed can be done in a lockless manner, and moreover, all buckets can be processed in parallel by different threads.

Accordingly, the control module 124, for an admitted operation 118, can update/modify the particular trie tree 504 of a particular control table bucket 502A with the proper information (represented as metadata/flow info 130). Thereafter, the control module 124 can translate this control database 126/500 into the more compact forwarding database 128 (represented as build new changes 132), which may be constructed to require a constrained (or more limited) number of memory accesses to perform a lookup (when compared to the number of accesses required to perform a lookup in the control database 126/500).

Figure 6:
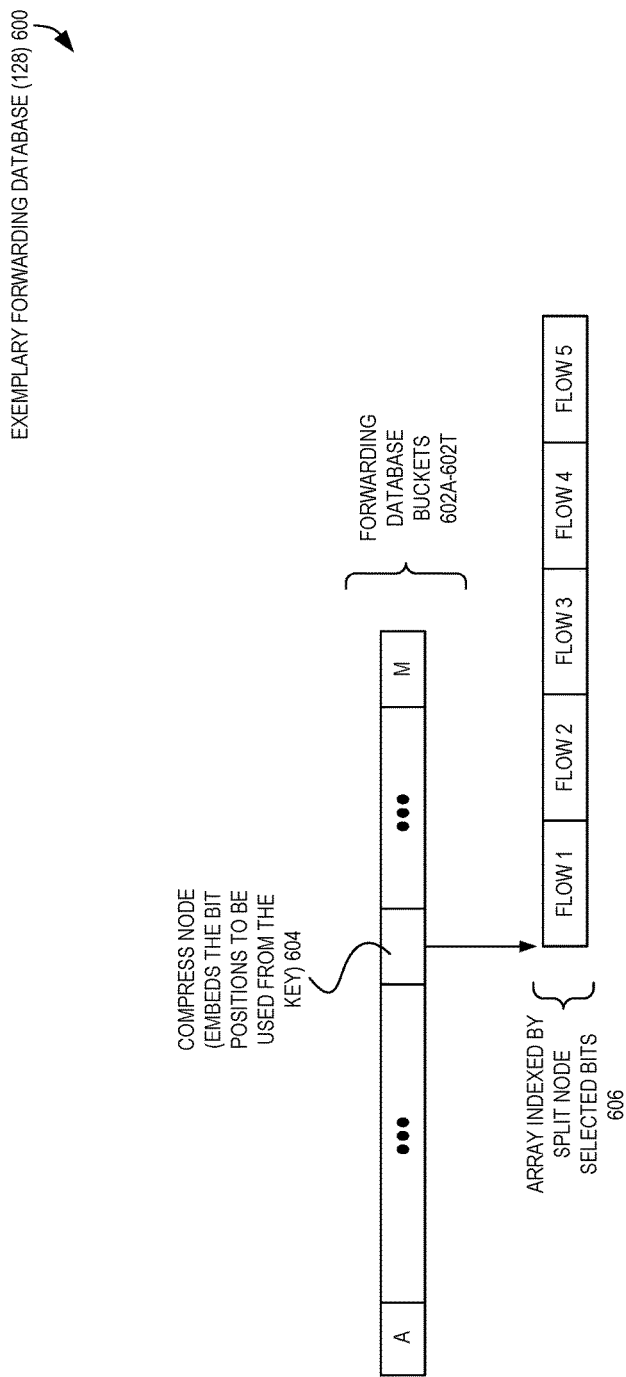
FIG. 6 is a block diagram illustrating an exemplary forwarding database utilized for architecture-independent dynamic flow learning according to some embodiments.

FIG. 6 is a block diagram illustrating an exemplary forwarding database 600 utilized for architecture-independent dynamic flow learning according to some embodiments. In some embodiments, the forwarding database 128/600 is simply the result of the post-processing of the control database 126/500 into a memory access efficient table. The final goal is to create a data structure which, upon accessing it for a result (i.e., a flow), produces the result with the fewest number of memory accesses. Accordingly, in some embodiments the forwarding database 128/600 can be derived from the control database 126/500 via builder logic of the control module 124.

In some embodiments, the building logic of the control module 124 will only get executed by the same thread that operated over the control database 126. The building logic (or "builder") can parse the affected control bucket into a new forwarding bucket. Note that the forwarding database 128 can have approximately the same layout of the control database 126, although each bucket's contents are different. Thus, the forwarding database 128/600 includes forwarding database buckets 602A-602T, where each bucket 602 is a compress node 604, which is a compact data structure with a pointer to an array 606 (containing all the colliding flows) and the split node metadata. The metadata simply embeds the bit positions needed to pick from the key to derive an index where to pick the resulting flow from. In some embodiments, to get to the correct bucket 602A, the same hash bits as used for the control database can also be picked as the index.

Turning back to FIG. 1, upon building new changes 132 for the forwarding database 128, the forwarding database building block is complete. Next, the notification path block can logically be thought of as the last step to be performed for a flow operation. This need not be as fast as the actual forwarding database management operations, as it may be the case that the only true requirement is that all notifications belonging to the same flow are delivered in order. Accordingly, in some embodiments this path (of the notification path block) may consciously be throttled to keep the system from collapsing, and to give more bandwidth to the high priority task of processing all inbound operations. Accordingly, the two main building blocks of the notification path block include the throttling module 138 (which utilizes notification queues 136) and the notification module 142.

Figure 7:
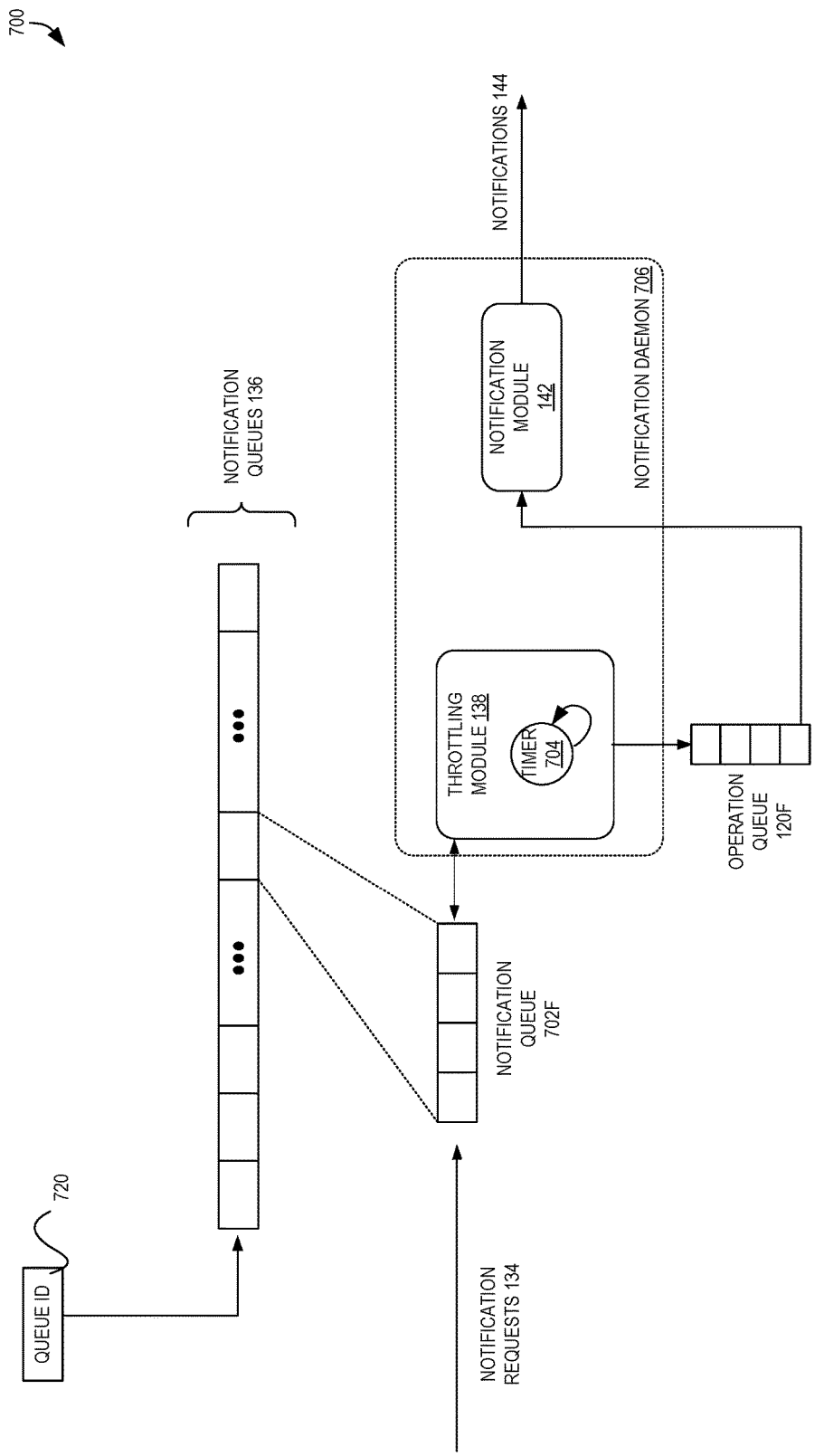
FIG. 7 is a block diagram illustrating exemplary notification queues and notification processing utilized for architecture-independent dynamic flow learning according to some embodiments.

FIG. 7 is a block diagram illustrating exemplary notification queues 700 and notification processing utilized for architecture-independent dynamic flow learning according to some embodiments. Notification throttling can be done by placing all new items (notification requests 134 requiring notifications) into software notification queues 136 based upon a queue identifier (ID) 720. The queue ID 720 can be derived from the current flow being processed, particularly its hash, since we use the same mapping the admission control used. In other words, each notification queue 702F/136 can be mapped one-to-one (1:1) with the operation queues 120 used by the forwarding path provisioning—i.e., each operation queue 120 has its "own" notification queue 702F, thus, the processing can be lockless due to only one thread operating upon it. These notification queues 702F/136 can be drained (i.e., processed) by timer daemons 704 (of a throttling module 138) tuned to execute at a configurable notification rate (e.g., 10 per millisecond, etc.), and thus a notification request can be placed back in the corresponding operation queue 120. Finally the notification module 142 can dispatch the notification(s) 144 to the application (e.g., placing data in a database, writing a record to a flat file, sending an electronic message to another application, etc.). In some embodiments, the notification processing can be performed using a batch technique, where multiple notifications can be included within one notification message 144.

Figure 2:
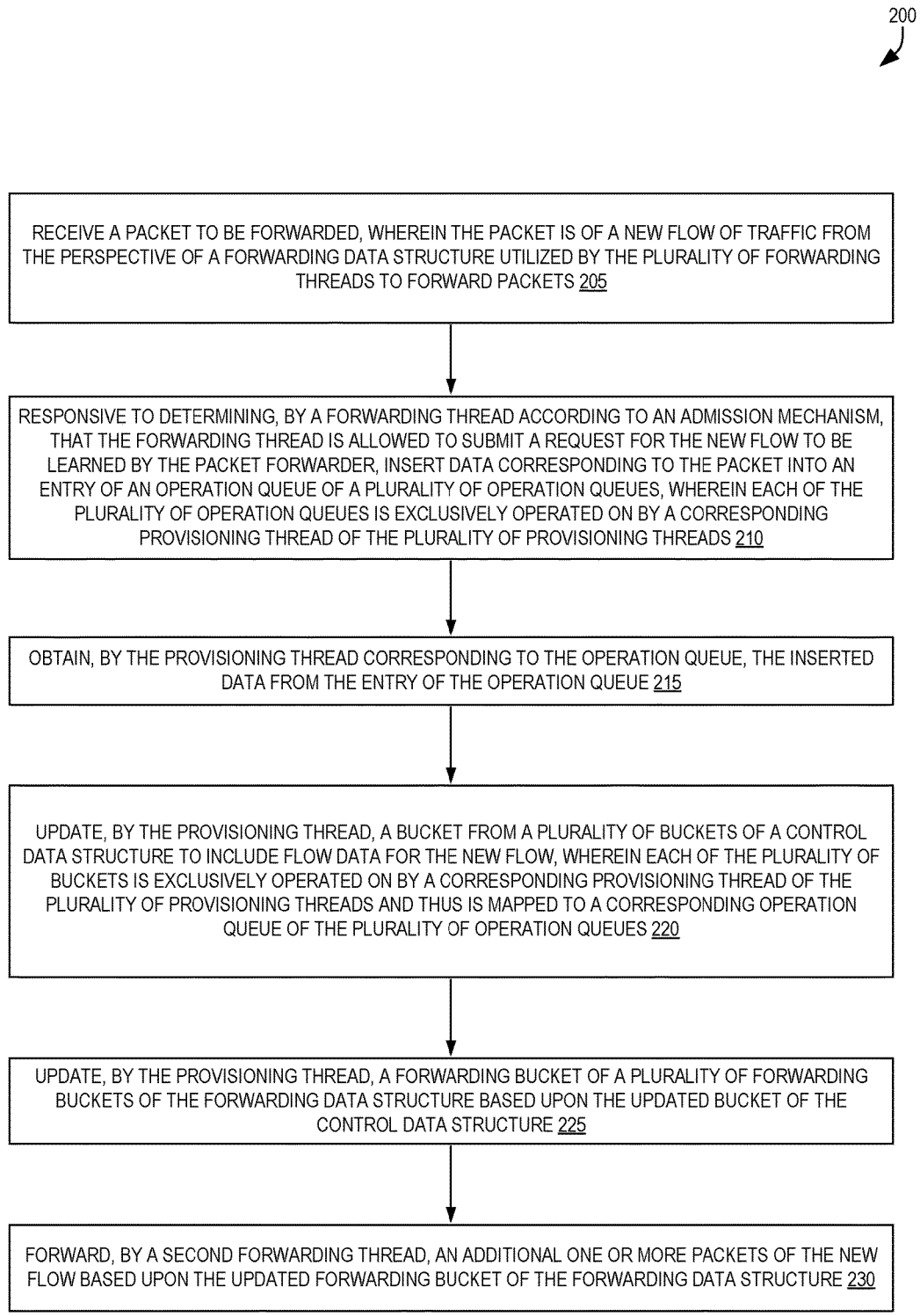
FIG. 2 is a flow diagram illustrating a flow for architecture-independent dynamic flow learning according to some embodiments.

We now turn back to FIG. 2, which is a flow diagram illustrating a flow 200 for architecture-independent dynamic flow learning according to some embodiments. Some or all of the operations of flow 200 can be performed by the packet forwarder 100 of FIG. 1.

Flow 200 includes, at block 205, receiving a packet to be forwarded by the packet forwarder. The packet is of a new flow of traffic from the perspective of a forwarding data structure utilized by the plurality of forwarding threads to forward packets.

Flow 200 also includes, at block 210, responsive to determining, by a forwarding thread (of the plurality of forwarding threads) according to an admission mechanism, that the forwarding thread is allowed to submit a request for the new flow to be learned by the packet forwarder, inserting data corresponding to the packet into an entry of an operation queue of a plurality of operation queues. Each of the plurality of operation queues is exclusively operated on by a corresponding provisioning thread of the plurality of provisioning threads.

Flow 200 also includes, at block 215, obtaining, by the provisioning thread corresponding to the operation queue, the inserted data from the entry of the operation queue.

At block 220, flow 200 includes updating, by the provisioning thread, a bucket from a plurality of buckets of a control data structure to include flow data for the new flow. Each of the plurality of buckets is exclusively operated on by a corresponding provisioning thread of the plurality of provisioning threads, and thus, is mapped to a corresponding operation queue of the plurality of operation queues.

Flow 200 also includes, at block 225, updating, by the provisioning thread, a forwarding bucket of a plurality of forwarding buckets of the forwarding data structure based upon the updated bucket of the control data structure.

At block 230, flow 200 includes forwarding, by a second forwarding thread, an additional one or more packets of the new flow based upon the updated forwarding bucket of the forwarding data structure.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8A:
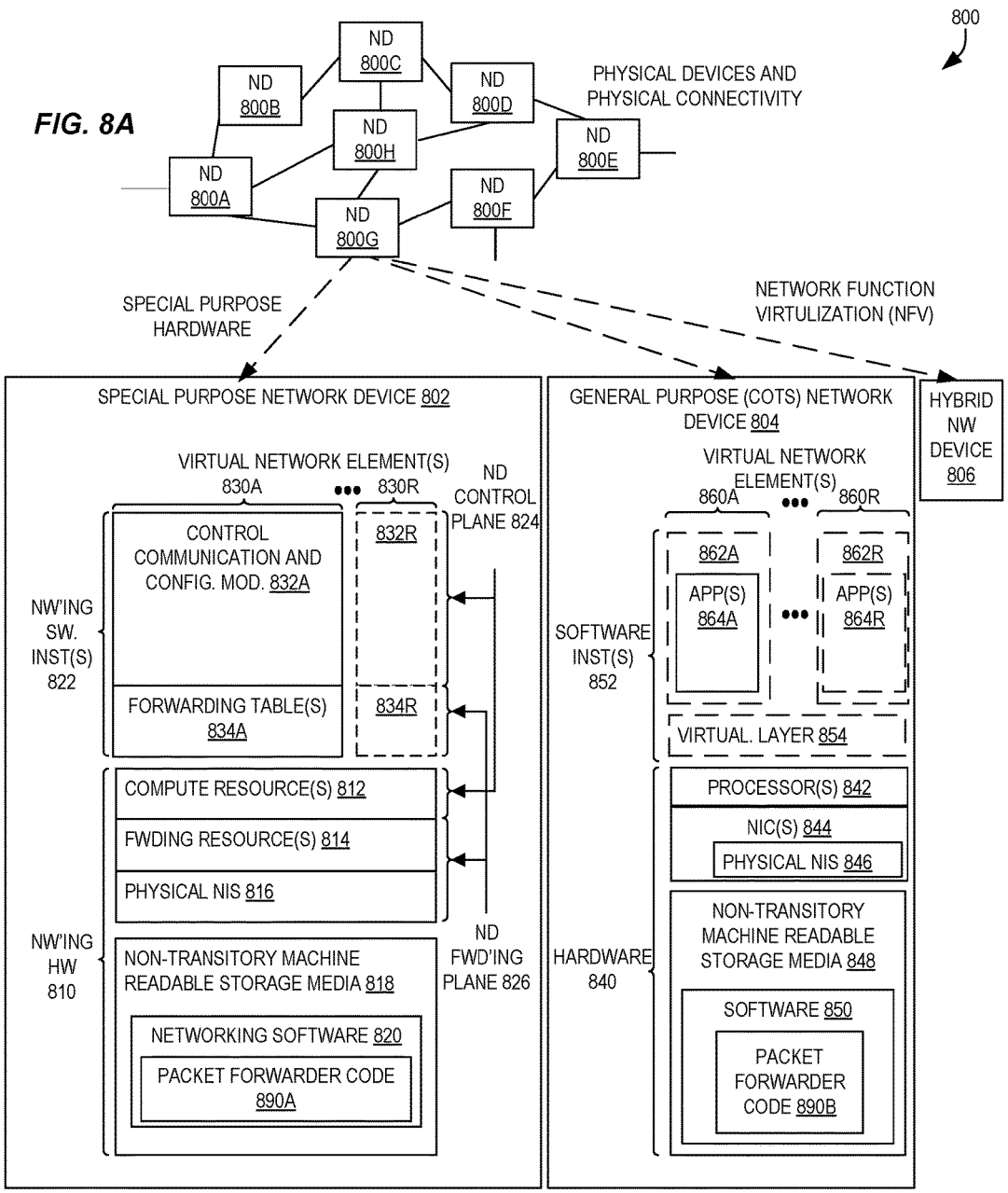
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments. FIG. 8A shows NDs 800A-800H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820 comprising packet forwarder code 890A (which, for example, can implement packet forwarder 100 when executed). A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-800H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-830R. Each of the virtual network element(s) (VNEs) 830A-830R includes a control communication and configuration module 832A-832R (sometimes referred to as a local control module or control communication module) and forwarding table(s) 834A-834R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the compute resource(s) 812 that execute the control communication and configuration module(s) 832A-832R; and 2) a ND forwarding plane 826 (sometimes referred to as a forwarding plane, a data plane, or a media plane) comprising the forwarding resource(s) 814 that utilize the forwarding table(s) 834A-834R and the physical NIs 816. By way of example, where the ND is a router (or is implementing routing functionality), the ND control plane 824 (the compute resource(s) 812 executing the control communication and configuration module(s) 832A-832R) is typically responsible for participating in controlling how data (e.g., packets) is to be routed (e.g., the next hop for the data and the outgoing physical NI for that data) and storing that routing information in the forwarding table(s) 834A-834R, and the ND forwarding plane 826 is responsible for receiving that data on the physical NIs 816 and forwarding that data out the appropriate ones of the physical NIs 816 based on the forwarding table(s) 834A-834R.

Figure 8B:
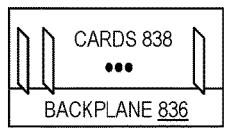
FIG. 8B illustrates an exemplary way to implement a special-purpose network device according to some embodiments.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850 comprising packet forwarder code 890B. During operation, the processor(s) 842 execute the software 850 to instantiate one or more sets of one or more applications 864A-864R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-862R called software containers that may each be used to execute one (or more) of the sets of applications 864A-864R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VWM)) or a hypervisor executing on top of a host operating system, and each of the sets of applications 864A-864R is run on top of a guest operating system within an instance 862A-862R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-862R, or as a combination of unikernels and the above-described techniques (e.g., unikernels and virtual machines both run directly on a hypervisor, unikernels and sets of applications that are run in different software containers).

The instantiation of the one or more sets of one or more applications 864A-864R, as well as virtualization if implemented, are collectively referred to as software instance(s) 852. Each set of applications 864A-864R, corresponding virtualization construct (e.g., instance 862A-862R) if implemented, and that part of the hardware 840 that executes them (be it hardware dedicated to that execution and/or time slices of hardware temporally shared), forms a separate virtual network element(s) 860A-860R.

The virtual network element(s) 860A-860R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 862A-862R corresponding to one VNE 860A-860R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-862R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-862R and the NIC(s) 844, as well as optionally between the instances 862A-862R; in addition, this virtual switch may enforce network isolation between the VNEs 860A-860R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-860R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
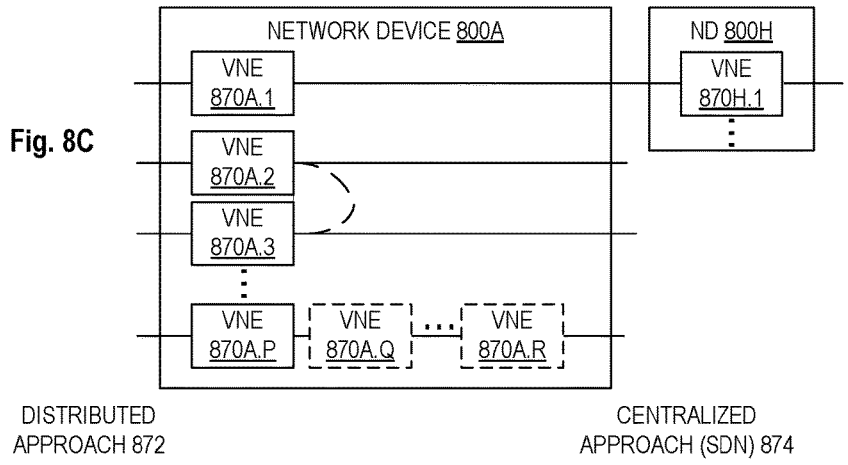
FIG. 8C illustrates various exemplary ways in which virtual network elements (VNEs) may be coupled according to some embodiments.

FIG. 8C illustrates various exemplary ways in which VNEs may be coupled according to some embodiments. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, Global Positioning Satellite (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-862R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet Local Area Network (LAN) emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
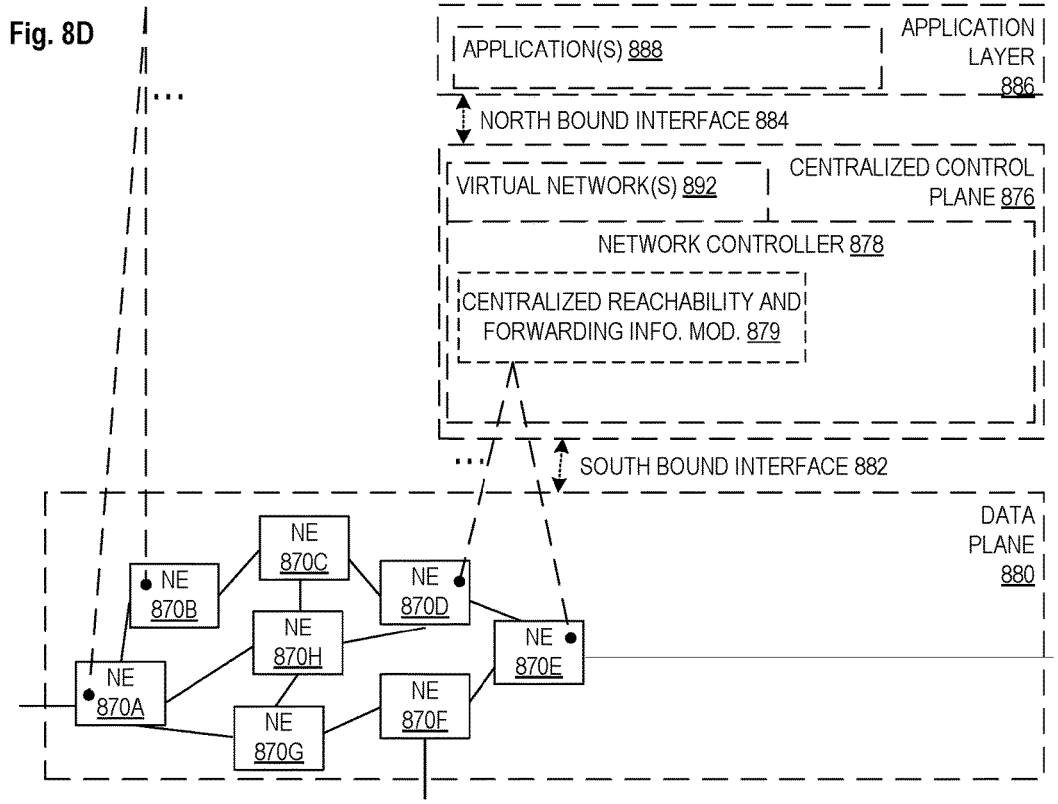
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments. Specifically, FIG. 8D illustrates network elements (NEs) 870A-870H with the same connectivity as the NDs 800A-800H of FIG. 8A.

FIG. 8D illustrates that the distributed approach 872 distributes responsibility for generating the reachability and forwarding information across the NEs 870A-870H; in other words, the process of neighbor discovery and topology discovery is distributed.

For example, where the special-purpose network device 802 is used, the control communication and configuration module(s) 832A-832R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for Label Switched Path (LSP) Tunnels and Generalized Multi-Protocol Label Switching (GMPLS) Signaling RSVP-TE)) that communicate with other NEs to exchange routes, and then selects those routes based on one or more routing metrics. Thus, the NEs 870A-870H (e.g., the compute resource(s) 812 executing the control communication and configuration module(s) 832A-832R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-834R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-870H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-870H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-832R of the ND control plane 824 typically include a control agent that provides the VNE side of the south bound interface 882. In this case, the ND control plane 824 (the compute resource(s) 812 executing the control communication and configuration module(s) 832A-832R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments, the control communication and configuration module(s) 832A-832R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-860R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments, the VNEs 860A-860R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-870H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments. For example: 1) embodiments may generally use the centralized approach (e.g., SDN) 874, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-800H implements a single NE 870A-870H, it should be understood that the network control approaches described with reference to FIG. 8D also work for networks where one or more of the NDs 800A-H implement multiple VNEs (e.g., VNEs 830A-R, VNEs 860A-860R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
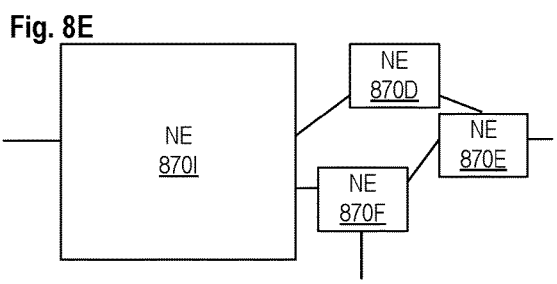
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
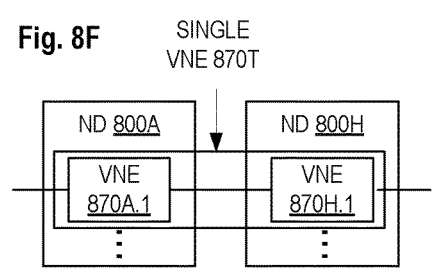
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-870H (see FIG. 8D), but the centralized control plane 876 has abstracted multiple of the NEs in different NDs (the NEs 870A-870C and 870G-870H) into (to represent) a single NE 8701 in one of the virtual network(s) 892 of FIG. 8D, according to some embodiments. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments. Thus, the abstraction of a NE or VNE can span multiple NDs.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Each VNE (e.g., a virtual router, a virtual bridge (which may act as a virtual switch instance in a Virtual Private Local Area Network Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

While the flow diagrams in the figures show a particular order of operations performed by certain embodiments, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a packet forwarder implemented by a device for architecture-independent dynamic flow learning, wherein the packet forwarder comprises a plurality of forwarding threads and a plurality of provisioning threads executed by the device, the method comprising:

receiving a packet to be forwarded by the packet forwarder, wherein the packet is of a new flow of traffic from the perspective of a forwarding data structure utilized by the plurality of forwarding threads to forward packets;

responsive to determining, by a forwarding thread of the plurality of forwarding threads according to an admission mechanism, that the forwarding thread is allowed to submit a request for the new flow to be learned by the packet forwarder, inserting data corresponding to the packet into an entry of an operation queue of a plurality of operation queues, wherein each of the plurality of operation queues is exclusively operated on by a corresponding provisioning thread of the plurality of provisioning threads;

obtaining, by the provisioning thread corresponding to the operation queue, the inserted data from the entry of the operation queue;

updating, by the provisioning thread, a bucket from a plurality of buckets of a control data structure to include flow data for the new flow, wherein each of the plurality of buckets is exclusively operated on by a corresponding provisioning thread of the plurality of provisioning threads and thus is mapped to a corresponding operation queue of the plurality of operation queues;

updating, by the provisioning thread, a forwarding bucket of a plurality of forwarding buckets of the forwarding data structure based upon the updated bucket of the control data structure; and forwarding, by a second forwarding thread, an additional one or more packets of the new flow based upon the updated forwarding bucket of the forwarding data structure.

2. The method of claim 1, further comprising:
inserting, by the provisioning thread, an entry into a notification queue that corresponds to the operation queue.

3. The method of claim 2, further comprising:
inserting, after a threshold amount of time by the provisioning thread, a second entry into the operation queue that corresponds to the notification queue based upon the entry of the notification queue;
obtaining, by the provisioning thread after the inserting of the second entry, the second entry from the operation queue; and
sending, by the provisioning thread, a notification indicating that the new flow has been learned by the packet forwarder.

4. The method of claim 3, wherein the second entry is inserted into the operation queue that corresponds to the notification queue along with one or more other entries as part of a batch operation, wherein the one or more other entries are based upon one or more other entries of the notification queue.

5. The method of claim 1, wherein determining according to the admission mechanism that the forwarding thread is allowed to submit a request for the new flow to be learned by the packet forwarder includes:
determining, by the forwarding thread, that there is a flow slot within an admission bucket that is free; and
reserving, by the forwarding thread, the flow slot utilizing a compare and swap operation.

6. The method of claim 5, wherein determining that there is the free flow slot within the admission bucket comprises:
utilizing, by the forwarding thread, a first set of one or more bits of a hash value to identify the admission bucket from a plurality of admission buckets, wherein the hash value that was generated based upon a hashing algorithm and values from the packet;
comparing, by the forwarding thread, a second set of one or more bits of the hash value with corresponding bits stored in each flow slot of a plurality of flow slots of the admission bucket to determine that the admission bucket does not include a duplicate flow; and
determining that the flow slot is free based upon one or more bit values of the flow slot.

7. The method of claim 1, further comprising:
receiving another packet to be forwarded by a second forwarding thread of the plurality of forwarding threads, wherein the another packet is of a second new flow of traffic from the perspective of the forwarding data structure; and
responsive to determining, by the second forwarding thread according to the admission mechanism, that the second forwarding thread is allowed to submit another request for the second new flow to be learned by the packet forwarder, inserting data corresponding to the another packet into a second entry of a second operation queue of the plurality of operation queues,
wherein the determining that the second forwarding thread is allowed to submit another request for the second new flow to be learned by the packet forwarder comprises:
determining that there is not any free entry in an admission bucket, and
bypassing the admission bucket responsive to a strict admittance condition being true.

8. A non-transitory machine-readable storage medium that provides instructions which, when executed by a processor of a device, will cause said device to implement a packet forwarder to perform operations for architecture-independent dynamic flow learning, wherein the packet forwarder comprises a plurality of forwarding threads and a plurality of provisioning threads executed by the device, wherein the operations comprise:
receiving a packet to be forwarded by the packet forwarder, wherein the packet is of a new flow of traffic from the perspective of a forwarding data structure utilized by the plurality of forwarding threads to forward packets;
responsive to determining, by a forwarding thread of the plurality of forwarding threads according to an admission mechanism, that the forwarding thread is allowed to submit a request for the new flow to be learned by the packet forwarder, inserting data corresponding to the packet into an entry of an operation queue of a plurality of operation queues, wherein each of the plurality of operation queues is exclusively operated on by a corresponding provisioning thread of the plurality of provisioning threads;
obtaining, by the provisioning thread corresponding to the operation queue, the inserted data from the entry of the operation queue;
updating, by the provisioning thread, a bucket from a plurality of buckets of a control data structure to include flow data for the new flow, wherein each of the plurality of buckets is exclusively operated on by a corresponding provisioning thread of the plurality of provisioning threads and thus is mapped to a corresponding operation queue of the plurality of operation queues;
updating, by the provisioning thread, a forwarding bucket of a plurality of forwarding buckets of the forwarding data structure based upon the updated bucket of the control data structure; and
forwarding, by a second forwarding thread, an additional one or more packets of the new flow based upon the updated forwarding bucket of the forwarding data structure.

9. The non-transitory machine-readable storage medium of claim 8, wherein the operations further comprise:
inserting, by the provisioning thread, an entry into a notification queue that corresponds to the operation queue.

10. The non-transitory machine-readable storage medium of claim 9, wherein the operations further comprise:
inserting, after a threshold amount of time by the provisioning thread, a second entry into the operation queue that corresponds to the notification queue based upon the entry of the notification queue;
obtaining, by the provisioning thread after the inserting of the second entry, the second entry from the operation queue; and
sending, by the provisioning thread, a notification indicating that the new flow has been learned by the packet forwarder.

11. The non-transitory machine-readable storage medium of claim 10, wherein the second entry is inserted into the operation queue that corresponds to the notification queue along with one or more other entries as part of a batch operation, wherein the one or more other entries are based upon one or more other entries of the notification queue.

12. The non-transitory machine-readable storage medium of claim 8, wherein determining according to the admission mechanism that the forwarding thread is allowed to submit a request for the new flow to be learned by the packet forwarder includes:
   determining, by the forwarding thread, that there is a flow slot within an admission bucket that is free; and
   reserving, by the forwarding thread, the flow slot utilizing a compare and swap operation.

13. The non-transitory machine-readable storage medium of claim 12, wherein determining that there is the free flow slot within the admission bucket comprises:
   utilizing, by the forwarding thread, a first set of one or more bits of a hash value to identify the admission bucket from a plurality of admission buckets, wherein the hash value that was generated based upon a hashing algorithm and values from the packet;
   comparing, by the forwarding thread, a second set of one or more bits of the hash value with corresponding bits stored in each flow slot of a plurality of flow slots of the admission bucket to determine that the admission bucket does not include a duplicate flow; and
   determining that the flow slot is free based upon one or more bit values of the flow slot.

14. The non-transitory machine-readable storage medium of claim 8, wherein the operations further comprise:
   receiving another packet to be forwarded by a second forwarding thread of the plurality of forwarding threads, wherein the another packet is of a second new flow of traffic from the perspective of the forwarding data structure; and
   responsive to determining, by the second forwarding thread according to the admission mechanism, that the second forwarding thread is allowed to submit another request for the second new flow to be learned by the packet forwarder, inserting data corresponding to the another packet into a second entry of a second operation queue of the plurality of operation queues,
   wherein the determining that the second forwarding thread is allowed to submit another request for the second new flow to be learned by the packet forwarder comprises:
      determining that there is not any free entry in an admission bucket, and
      bypassing the admission bucket responsive to a strict admittance condition being true.

15. A device to implement a packet forwarder to utilize architecture-independent dynamic flow learning, wherein the packet forwarder is to comprise a plurality of forwarding threads and a plurality of provisioning threads executed by the device, the device comprising:
   one or more processors; and
   a non-transitory machine-readable storage medium that provides instructions which, when executed by the one or more processors, will cause the packet forwarder to perform operations comprising:
      receiving a packet to be forwarded by the packet forwarder, wherein the packet is of a new flow of traffic from the perspective of a forwarding data structure utilized by the plurality of forwarding threads to forward packets;
      responsive to determining, by a forwarding thread of the plurality of forwarding threads according to an admission mechanism, that the forwarding thread is allowed to submit a request for the new flow to be learned by the packet forwarder, inserting data corresponding to the packet into an entry of an operation queue of a plurality of operation queues, wherein each of the plurality of operation queues is exclusively operated on by a corresponding provisioning thread of the plurality of provisioning threads;
      obtaining, by the provisioning thread corresponding to the operation queue, the inserted data from the entry of the operation queue;
      updating, by the provisioning thread, a bucket from a plurality of buckets of a control data structure to include flow data for the new flow, wherein each of the plurality of buckets is exclusively operated on by a corresponding provisioning thread of the plurality of provisioning threads and thus is mapped to a corresponding operation queue of the plurality of operation queues;
      updating, by the provisioning thread, a forwarding bucket of a plurality of forwarding buckets of the forwarding data structure based upon the updated bucket of the control data structure; and
      forwarding, by a second forwarding thread, an additional one or more packets of the new flow based upon the updated forwarding bucket of the forwarding data structure.

16. The device of claim 15, wherein the operations further comprise: inserting, by the provisioning thread, an entry into a notification queue that corresponds to the operation queue.

17. The device of claim 16, wherein the operations further comprise:
   inserting, after a threshold amount of time by the provisioning thread, a second entry into the operation queue that corresponds to the notification queue based upon the entry of the notification queue;
   obtaining, by the provisioning thread after the inserting of the second entry, the second entry from the operation queue; and
   sending, by the provisioning thread, a notification indicating that the new flow has been learned by the packet forwarder.

18. The device of claim 17, wherein the second entry is inserted into the operation queue that corresponds to the notification queue along with one or more other entries as part of a batch operation, wherein the one or more other entries are based upon one or more other entries of the notification queue.

19. The device of claim 15, wherein determining according to the admission mechanism that the forwarding thread is allowed to submit a request for the new flow to be learned by the packet forwarder includes:
   determining, by the forwarding thread, that there is a flow slot within an admission bucket that is free; and
   reserving, by the forwarding thread, the flow slot utilizing a compare and swap operation.

20. The device of claim 19, wherein determining that there is the free flow slot within the admission bucket comprises:
   utilizing, by the forwarding thread, a first set of one or more bits of a hash value to identify the admission bucket from a plurality of admission buckets, wherein the hash value that was generated based upon a hashing algorithm and values from the packet;
   comparing, by the forwarding thread, a second set of one or more bits of the hash value with corresponding bits stored in each flow slot of a plurality of flow slots of the admission bucket to determine that the admission bucket does not include a duplicate flow; and determining that the flow slot is free based upon one or more bit values of the flow slot.

* * * * *